US008512467B2

(12) United States Patent
Burgard

(10) Patent No.: US 8,512,467 B2
(45) Date of Patent: *Aug. 20, 2013

(54) ZINC OXIDE NANOPARTICLE DISPERSIONS

(75) Inventor: Detlef Burgard, Volklingen (DE)

(73) Assignee: Air Products and Chemicals, Inc., Allentown, PA (US)

( * ) Notice: Subject to any disclaimer, the term of this patent is extended or adjusted under 35 U.S.C. 154(b) by 539 days.

This patent is subject to a terminal disclaimer.

(21) Appl. No.: 11/832,393

(22) Filed: Aug. 1, 2007

(65) Prior Publication Data

US 2008/0176986 A1    Jul. 24, 2008

Related U.S. Application Data

(60) Provisional application No. 60/839,086, filed on Aug. 21, 2006.

(51) Int. Cl.
*C09D 1/00* (2006.01)
*C08K 3/22* (2006.01)

(52) U.S. Cl.
USPC .......................................... 106/425; 524/432

(58) Field of Classification Search
USPC ........................ 106/425; 524/432
See application file for complete search history.

(56) References Cited

U.S. PATENT DOCUMENTS

| | | | |
|---|---|---|---|
| 4,767,729 A * | 8/1988 | Osman et al. ................. | 264/616 |
| 5,320,874 A | 6/1994 | Kansupada et al. | |
| 6,489,382 B1 | 12/2002 | Giesecke et al. | |
| 6,818,050 B1 | 11/2004 | Nyssen | |
| 7,045,005 B2 * | 5/2006 | Sakatani et al. ......... | 106/287.17 |
| 7,348,029 B2 * | 3/2008 | Kliss et al. .................... | 424/490 |
| 7,438,836 B2 * | 10/2008 | Michael et al. ............ | 252/518.1 |
| 2005/0276764 A1 | 12/2005 | Kolbe et al. | |
| 2006/0002875 A1 | 1/2006 | Winkler et al. | |
| 2006/0110352 A1 | 5/2006 | Milbradt et al. | |
| 2007/0078190 A1 | 4/2007 | DiStefano | |

FOREIGN PATENT DOCUMENTS

| | | |
|---|---|---|
| DE | 10327432 | 6/2003 |
| DE | 10327433 | 1/2005 |
| DE | 2005084631 | 9/2005 |
| DE | 102004011111 | 9/2005 |
| EP | 0542669 | 5/1993 |
| EP | 1371359 | 12/2003 |
| JP | 05-210009 | 8/1992 |
| JP | 2002012821 A * | 1/2002 |
| JP | 2004091521 A * | 3/2004 |
| WO | 0193677 | 12/2001 |
| WO | 2004/000916 A | 12/2003 |
| WO | WO 2004000916 A2 * | 12/2003 |
| WO | 2005019348 | 7/2004 |
| WO | 2007/082155 A | 7/2007 |

OTHER PUBLICATIONS

Santos et al., J. European Ceramic Society, 24 (2004), 3713-3721.*
JP 2004091521 A, Mar. 2004, Higashiura et al., DERWENT AB.*
JP 2002012821 A, Jan. 2002, Yamada et al., DERWENT AB.*

* cited by examiner

*Primary Examiner* — Satya Sastri
(74) *Attorney, Agent, or Firm* — Michael K. Boyer

(57) ABSTRACT

The disclosure relates to zinc oxide (ZnO) nanoparticle dispersions and to such dispersions having a defined color, and films obtained from such dispersions. The zinc oxide dispersions can be used as a UV-absorber, for catalytic applications, electronic applications, production of antifungal or antibacterial materials, sensors, actuators, photovoltaic devices, conductive coatings, among other applications.

16 Claims, 1 Drawing Sheet

CIE L*a*b* - System

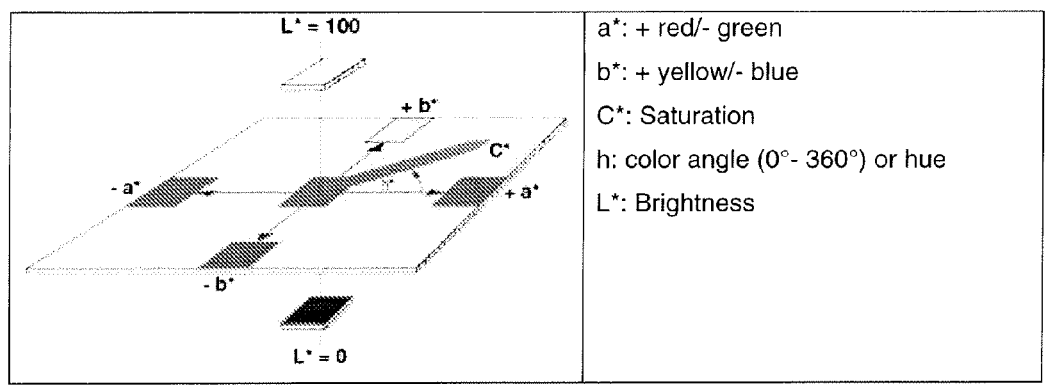
CIE L*a*b* - System

ZINC OXIDE NANOPARTICLE DISPERSIONS

The instant application claims the benefit of U.S. Provisional Patent Application No. 60/839,086, filed Aug. 21, 2006. The disclosure of this Application is hereby incorporated by reference.

CROSS REFERENCE TO RELATED PATENTS AND PATENT APPLICATIONS

The subject matter of the instant application is related to U.S. patent application Ser. No. 11,583,439, filed Oct. 19, 2006, and Ser. No. 11/524,471, filed Sep. 21, 2006. The disclosure of the previously identified patent applications is hereby incorporated by reference.

FIELD OF THE INVENTION

The instant invention relates to zinc oxide (ZnO) nanoparticle dispersions and to such dispersions having a defined color, and films obtained from such dispersions. The inventive zinc oxide dispersions can be used as a UV-absorber, for catalytic applications, electronic applications, production of antifungal or antibacterial materials, sensors, actuators, photovoltaic devices, conductive coatings, among other applications

BACKGROUND OF THE INVENTION

Exposure to UV radiation can lead to the degradation of certain materials. There is a need to protect exposed materials against UV and in some cases to avoid transmission of UV radiation through transparent covers or coatings. In order to be used for transparent coatings, UV protecting agents are preferably transparent and, in some cases, colorless in the final application. For some applications or end-uses these agents are permanent, non migratory and stable against degradation. Organic UV protecting agents or absorbers can be migratory and have unacceptable long term stability (e.g., less than 10 years). In some cases organic UV absorbers are not stable against oxidation or at relatively high temperatures. Inorganic UV absorbers (e.g. ZnO, $TiO_2$, $Fe_2O_3$, $CeO_2$, among other inorganic compounds), can have enhanced stability in comparison to organic absorbers. However, inorganic absorbers may not be transparent and/or colorless, or they may be photocatalytically active and in some cases adversely affect a surrounding polymeric matrix when exposed to UV. There is a need in this art for dispersions which can be used as an inorganic transparent UV blocking additive for preparing transparent materials or coatings with low haze levels.

BRIEF SUMMARY OF THE INVENTION

It is known in the art that a white dispersion will be produced when mixing a white powder, e.g. ZnO with a colorless liquid (e.g. water, ethanol, toluene, among others). Surprisingly, it was found, that, under certain conditions, which are described below certain ZnO nanoparticle dispersions in colorless solvents have a yellow color tone. Such yellow zinc oxide nanoparticle dispersions can show improved properties in comparison to white ZnO dispersions. Commercial, white nanoparticle ZnO dispersions and the inventive yellow dispersions were used as a UV absorbing additive in an acrylic coating. The haze values of the acrylic coatings were measured and the haze values were significantly lower for the coatings made from the inventive yellow dispersions.

BRIEF DESCRIPTION OF SEVERAL VIEWS OF THE DRAWINGS

FIG. 1 is a plot of color as represented by the CIE L*a*b* parameters.

DETAILED DESCRIPTION OF THE INVENTION

This invention solves problems associated with conventional UV absorbers by providing zinc oxide dispersions which can be used as an inorganic transparent UV blocking additive to transparent coatings or materials. The zinc oxide particles will normally range in size from about 5 to about 200 nanometers with a mean particle size of about 50 nm. The dispersion will normally comprise or consist essentially of about $10^{-3}$ to about 95 wt. % of zinc oxide nanoparticles and about 0.1 to about 50 wt. % of at least one dispersing agent. Examples of suitable dispersing agents comprise at least one member selected from the group consisting of diammonium-citrate, catechols (e.g. 4,5-dihydroxy-m-benzenedisulfonic acid disodium salt), certain block copolymers with pigment affinic groups (e.g., Byk 190, methoxy-ethoxy-ethoxy-acetic acid, oligo- or polyacrylic acids and their compounds, mixtures thereof, among others.

The dispersion can also comprise at least one carrier or diluent. The carrier can be aqueous (e.g., deionized water), or based upon one or more suitable organic compounds. Examples of suitable organic compounds can comprise at least one member selected from the group consisting of isoproproxyethanol, ethanol, toluene, alcohols, butanol, isopropyl alcohol, acetone, methylethylketone, diacetone alcohol, carbitols, glycols, diglycols, triglycols, glycol ethers, ethoxy-, propoxy-, isopropoxy-, butoxyethanol-acetate esters, glycolesters, ethyl acetate, butyl acetate, butoxyethyl acetate, alkanes, toluene, xylene, acrylic acid, methacrylic acid, acrylate or methacrylate monomers as well as their derivatives, among other suitable substrates. The amount of carrier can range from about <10 wt. % to about 99 wt. % of the dispersion.

The dispersions can be prepared by any suitable methods such as stirring, shaking, all kind of milling, e.g. media milling, three roll milling, high speed dispersing, rotor stator techniques, sonication, jet milling, to name a few applicable techniques In one aspect of the invention, the inventive dispersions can be employed for preparing transparent materials or coatings with low haze levels and other desirable properties. The inventive dispersions can be used for making a coating or film having a haze of about lower or equal to 0.5 to about 3.0 when measured in accordance with ASTM D1003. The coating is also normally transparent as determined by ASTM D1003. The thickness of the coating will typically be about 100 nm to about 50 microns.

The inventive dispersion can be added to a wide range of polymeric formulations and systems. Examples of such systems including acrylic, polyurethane, epoxy, polyesters, polyethers, polyolefines, siloxanes, organic inorganic (nano) composites, among others. The amount of dispersion that is added to the polymeric formulation will normally range from about $10^{-3}$ wt. % to about 80 wt. % of the formulation.

The inventive dispersions can be added to the foregoing formulations and systems by any suitable method. Examples of suitable methods comprise shaking, stirring, the previously described milling/dispersing processes, dynamic, static mixers or other blending techniques.

In another aspect of the invention, the inventive dispersion can be applied onto any suitable substrate. Examples of suitable substrates comprise at least one member selected from the group consisting of glass, polymeric substrates, e.g. PC, PMMA, PET, PVC, PE, PP, PVB, PA, polyesters, polyamides, epoxy, polyurethanes, siloxanes, cotton, linen, wool, textiles, nonwovens, among other suitable substrates.

In a further aspect of the invention, the inventive dispersion after incorporated into a suitable coating composition and the coating applied onto a suitable substrates. Examples of suitable substrates comprise at least one member selected from the group consisting of e.g. PC, PMMA, PET, PVC, PE, PP, PVB, PA, polyesters, polyamides, epoxy, polyurethanes, siloxanes, cotton, linen, wool, textiles, nonwovens.

If desired, either the dispersion or a coating composition comprising the dispersion can be applied onto a suitable substrate and heated treated (e.g., to a temperature greater than 100 C). The heat treatment can be sufficient to remove substantially all components other than ZnO nanoparticles. The remaining ZnO coated substrate can be employed in a wide range of applications including, without limitation, such as UV-absorber, catalyst, electronic device, antifungal or antibacterial material, sensor, actuator, photovoltaic device, conductive material, bearing, among other applications.

If desired the dispersion can include at least one additive such as wetting agents, surfactants, defoamers, and other additives used to formulate inks, coatings and adhesives.

The following examples are set forth to assist in understanding the invention and do not limit the invention described and claimed herein. Such variations of the invention, including the substitution of all equivalents now known or later developed, which would be within the purview of those skilled in the art, and changes in formulations or minor changes in experimental design, fall within the scope of the present invention.

EXAMPLES

Example 1

3 g of Diammoniumcitrate were dissolved in 237 g deionized water. While stirring, 60 g of nanoparticle ZnO, primary particle size 30 nm, were slowly added. The mixture was pumped through a flow cell (a "flow cell" is a continuously working reactor wherein the dispersion was ultrasonically agitated), and ultrasonically agitated for 2.5 h. After that, the dispersion was milled with a Netzsch MiniCer at 2500-3000 rpm. for 160 min.

Example 2

15 g of 4,5-dihydroxy-m-benzenedisulfonic acid disodium salt were dissolved in 685 g deionized water. While stirring, 300 g of nanoparticle ZnO (as described in Example 1) were slowly added. The mixture was further stirred for two hours, then 37.5 g Disperbyk 190 were added. Afterwards, the dispersion was pumped through a flow cell and ultrasonically agitated for 4.5 h. After that, the dispersion was divided into two portions and every portion was milled with a Netzsch MiniCer at 2500-3000 rpm for 160 min.

Example 3

70 g of nanoparticle ZnO (as described in Example 1), 4.2 g Methoxy-ethoxy-ethoxy-acetic acid and 23 g Isopropoxyethanol were mixed in a beaker. The mixture was further homogenized using a three roller mill (i.e., Exakt 80E). The resulting paste was diluted with ethanol while stirring until a solid content of about 30 wt. % ZnO was achieved. Afterwards, the dispersion was pumped through a flow cell and ultrasonically agitated for 2.5 h. After that, the dispersion was milled with a Netzsch MiniCer at 2500-3000 rpm for 160 min.

Example 4

70 g of nanoparticle ZnO (as described in Example 1) and 70 g Byk 9077 were mixed in a beaker. The mixture was further homogenized using the three roller mill described in Example 3. The resulting paste was diluted with of toluene while stirring until a solid content of about 30 wt. % ZnO was achieved. Afterwards, the dispersion was pumped through a flow cell and ultrasonically agitated for 2.5 h. After that, the dispersion was milled with a Netzsch MiniCer at 2,500-3,000 rpm for 160 min.

Example 5

A commercial aqueous dispersion of nanoparticle ZnO (solid content 45 wt. %) was mixed with an aqueous acrylic emulsion (solid content 50 wt. %, particle size about 400 nm). The acrylic solid to ZnO solid ratio was adjusted to 0.7:0.3. The resulting mixture was coated on glass with a wet coating thickness of 24 g/m$^2$. The coating was dried for 5 min at 120° C. The resulting haze value (measured with Haze Gard Plus, Byk Gardner and in accordance with ASTM D 1003), was 34.

Example 6

Example 5 was repeated except that instead of the commercial dispersion of Example 5, the dispersion of Example 2 was used. The resulting haze value of the coating was 2.9.

Example 7

40 g Pentaerythritol tetraacrylate, 10 g Hexanedioldiacrylate and 2 g Irgacure 184 were dissolved in 50 g ethanol. To this solution, 1.5 g of ZnO dispersion of Example 3 were added. The solution was coated onto a glass sheet with a wet coating thickness of 50 µm. The coating was cured by UV radiation (1760 mJ/cm$^2$). The transparency in the visible of the resulting coating was 90.2% and the haze value was 0.5.

Referring now to FIG. 1, FIG. 1 illustrates the relationship among color parameters wherein L* corresponds to the brightness, a* the red/green parameter, b* the yellow/blue parameter, C* the Saturation and h* the color angle or hue of the testing Sample. A positive a* parameter indicates a red color whereas a negative a* corresponds to green. A positive b* parameter indicates a yellow color whereas a negative b* corresponds to blue.

The color parameters (CIE L*a*b*) of all dispersions were measured with a spectral photometer Byk Gardner Color Sphere (Table 1) in accordance with ASTM D 2244, E 308, E 1164

Table 1 illustrates that the inventive ZnO dispersions all have a b* value greater than 10.

TABLE 1

| Sample | | L* | a* | b* | C* | h* |
|---|---|---|---|---|---|---|
| Commercial dispersion | D65/10° | 84.89 | 0.23 | 5.39 | 5.40 | 87.60 |
| | A/10° | 85.29 | 1.59 | 5.57 | 5.79 | 74.09 |
| | CWF/10° | 85.18 | 0.15 | 6.09 | 6.09 | 88.55 |
| Example 1 | D65/10° | 76.22 | −0.26 | 13.48 | 13.48 | 91.11 |
| | A/10° | 77.06 | 2.85 | 13.57 | 13.87 | 78.14 |
| | CWF/10° | 76.88 | −0.19 | 15.48 | 15.48 | 90.71 |

TABLE 1-continued

| Sample | | L* | a* | b* | C* | h* |
|---|---|---|---|---|---|---|
| Example 2 | D65/10° | 75.71 | 2.59 | 13.81 | 14.05 | 79.37 |
| | A/10° | 76.90 | 5.73 | 14.78 | 15.85 | 68.82 |
| | CWF/10° | 76.48 | 1.69 | 15.78 | 15.87 | 83.88 |
| Example 3 | D65/10° | 62.50 | −0.21 | 13.40 | 13.40 | 90.89 |
| | A/10° | 63.33 | 2.60 | 13.50 | 13.74 | 79.09 |
| | CWF/10° | 63.22 | −0.13 | 15.49 | 15.50 | 90.50 |
| Example 4 | D65/10° | 58.12 | −0.05 | 11.79 | 11.79 | 90.26 |
| | A/10° | 58.86 | 2.33 | 11.98 | 12.20 | 78.99 |
| | CWF/10° | 58.78 | −0.01 | 13.61 | 13.61 | 90.05 |

The present invention is not to be limited in scope by the specific embodiments disclosed in the examples which are intended as illustrations of a few aspects of the invention and any embodiments that are functionally equivalent are within the scope of this invention. Indeed, various modifications of the invention in addition to those shown and described herein will become apparent to those skilled in the art and are intended to fall within the scope of the appended claims.

The invention claimed is:

1. A dispersion comprising zinc oxide having a mean particle size of about 50 nm, water, and, 4,5-dihydroxy-m-benzenedisulfonic acid disodium salt; wherein the dispersion has a b* value greater than about 10 when measured in accordance with ASTM D 2244.

2. The dispersion of claim 1 further comprising at least one member selected from the group consisting of isoproproxyethanol, ethanol, toluene and mixtures thereof.

3. The dispersion of claim 1 wherein the dispersion has a C* value of greater than 10 when measured in accordance with ASTM D 2244.

4. A cured or dried coating composition comprising the dispersion of claim 1.

5. The coating composition of claim 4 further comprising at least one polymeric compound.

6. The coating composition of claim 5 wherein the coating as a haze value when measured in accordance with ASTM D 1003 of less than about 3.0.

7. A coating composition comprising the dispersion of claim 1, and at least one member selected from the group consisting of acrylic, polyurethane, epoxy, polyesters, polyethers, polyolefins and siloxanes, wherein the haze when measured in accordance with ASTM D 1003 is less than about 1.0.

8. The dispersion of claim 1 further comprising diammoniumcitrate.

9. The dispersion of claim 8 further comprising at least one member selected from the group consisting of isoproproxyethanol, ethanol, toluene and mixtures thereof.

10. A cured or dried coating composition comprising the dispersion of claim 8.

11. The coating composition of claim 10 further comprising at least one polymeric compound.

12. A coating composition comprising the dispersion of claim 8, and at least one member selected from the group consisting of acrylic, polyurethane, epoxy, polyesters, polyethers, polyolefins and siloxanes.

13. A dispersion comprising zinc oxide nanoparticles, water, at least one member selected from the group consisting of diammoniumcitrate, 4,5-dihydroxy-m-benzenedisulfonic acid disodium salt, and their compounds and mixtures thereof; at least one polymer, and isoproproxyethanol.

14. The dispersion of claim 13 wherein the polymer comprises at least one member selected from the group consisting of acrylic, polyurethane, epoxy, polyesters, polyethers, and polyolefins.

15. The dispersion of claim 14 wherein the polymer comprises an acrylic.

16. The dispersion of claim 13 wherein said dispersion has a b* value greater than about 10 when measured in accordance with ASTM D 2244.

* * * * *